United States Patent
Kogo

(10) Patent No.: US 7,730,720 B2
(45) Date of Patent: Jun. 8, 2010

(54) EXHAUST GAS PURIFICATION APPARATUS REGENERATION SYSTEM OF INTERNAL COMBUSTION ENGINE

(75) Inventor: Tomoyuki Kogo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 390 days.

(21) Appl. No.: 11/794,483

(22) PCT Filed: Jan. 16, 2006

(86) PCT No.: PCT/JP2006/300907

§ 371 (c)(1),
(2), (4) Date: Jun. 29, 2007

(87) PCT Pub. No.: WO2006/075801

PCT Pub. Date: Jul. 20, 2006

(65) Prior Publication Data

US 2008/0307773 A1    Dec. 18, 2008

(30) Foreign Application Priority Data

Jan. 17, 2005    (JP)    ............................. 2005-008871

(51) Int. Cl.
F01N 3/00    (2006.01)
(52) U.S. Cl. .............................. 60/286; 60/295; 60/297; 60/303
(58) Field of Classification Search .................... 60/286, 60/295, 297, 301, 303
See application file for complete search history.

(56) References Cited

U.S. PATENT DOCUMENTS 4,630,438 A    12/1986    Shinzawa

| | | | |
|---|---|---|---|
| 2002/0078684 A1 * | 6/2002 | Carberry et al. ................ | 60/295 |
| 2004/0194450 A1 | 10/2004 | Tanaka et al. | |
| 2006/0130460 A1 * | 6/2006 | Warner ......................... | 60/286 |

FOREIGN PATENT DOCUMENTS

| FR | 2807472 A1 * | 10/2001 |
|---|---|---|
| JP | B2-03-009285 | 2/1991 |
| JP | A-10-077826 | 3/1998 |

(Continued)

*Primary Examiner*—Binh Q. Tran
(74) *Attorney, Agent, or Firm*—Oliff & Berridge, PLC

(57) ABSTRACT

There is provided a technology that enables, in an exhaust gas purification apparatus regeneration system of an internal combustion engine, to prevent the remaining fuel quantity from decreasing to an unduly small quantity during execution of regeneration control for regenerating the exhaust gas purification ability of the exhaust gas purification apparatus by supplying fuel to the exhaust gas purification apparatus. The system of the invention has command device capable of being operated by a driver for sending a regeneration execution command to cause regeneration control execution device to execute the regeneration control and notification device for notifying the driver to prompt the driver to send the regeneration execution command to the regeneration control execution device through the command device. Time of notification by said notification device is controlled so that it is prevented that the regeneration execution command is sent to said regeneration control execution device by said command device while notification is given to the driver by said notification device and the quantity of remaining fuel becomes equal to or lower than a specified remaining quantity during execution of the regeneration control executed in response to the regeneration execution command.

7 Claims, 3 Drawing Sheets

FOREIGN PATENT DOCUMENTS

| | | | |
|---|---|---|---|
| JP | A-10-246108 | 9/1998 |  |
| JP | A-2002-371831 | 12/2002 |  |
| JP | 2003155914 A | * 5/2003 |  |
| JP | A-2003-129835 | 5/2003 |  |
| JP | A-2003-155914 | 5/2003 |  |
| JP | A-2004-143987 | 5/2004 |  |
| JP | A-2004-183506 | 7/2004 |  |
| JP | 2004285947 A | * 10/2004 |  |
| JP | A-2004-285947 | 10/2004 |  |

* cited by examiner

US 7,730,720 B2

EXHAUST GAS PURIFICATION APPARATUS REGENERATION SYSTEM OF INTERNAL COMBUSTION ENGINE

TECHNICAL FIELD

The present invention relates to a regeneration system of an exhaust gas purification apparatus of an internal combustion engine for regenerating the exhaust gas purification ability of the exhaust gas purification apparatus that purifies the exhaust gas discharged from the internal combustion engine by supplying fuel to the exhaust gas purification apparatus.

PRIOR ART

There has been known a technology of providing an exhaust gas purification apparatus in an exhaust passage of an internal combustion engine so as to purify the exhaust gas discharged from the internal combustion engine. Such an exhaust gas purification apparatus includes, for example, a particulate filter (which will be simply referred to as a filter hereinafter) that traps particulate matter (which will be referred to as PM hereinafter) contained in the exhaust gas and an NOx storage reduction catalyst (which will be simply referred to as NOx catalyst hereinafter) that stores NOx contained in the exhaust gas when the ambient atmosphere is oxidizing atmosphere, and reduces NOx stored therein when the ambient atmosphere is reducing atmosphere.

There has also been developed a technology of regenerating the exhaust gas purification ability of such an exhaust gas purification apparatus, when the exhaust gas purification ability thereof is deteriorated, by supplying fuel to the exhaust gas purification apparatus. For example, Japanese Patent Application Laid-Open No. 2003-155914 discloses a technology of providing, in the driver's cabin of a vehicle, a regeneration button for allowing to activate, at will, filter regeneration control execution device for executing what is called filter regeneration control for oxidizing and removing PM deposited in a filter. Japanese patent Application Laid-Open No. 10-77826, Japanese Patent Publication No. 3-9285 and Japanese Patent Application No. 2004-143987 also disclose technologies of activating the filter regeneration control using such a regeneration button.

DISCLOSURE OF THE INVENTION

In regeneration control for regenerating the exhaust gas purification ability of an exhaust gas purification apparatus such as a filter or an NOx catalyst provided in an exhaust passage of an internal combustion engine, fuel is sometimes supplied to the exhaust gas purification apparatus. In some cases, command device for sending a regeneration execution command to regeneration control execution device that executes the above described regeneration control is provided, and the regeneration control is conducted upon operation of the command device by a driver.

When the regeneration control is executed, fuel is used also in the regeneration control in addition to in driving the internal combustion engine. Therefore, while the regeneration control is executed, the remaining fuel quantity is likely to decrease more quickly than during normal driving or during the time in which the regeneration control is not being executed. For this reason, when the driver enters a regeneration execution command to the regeneration control execution device through the command device, there is a possibility that the remaining fuel quantity decreases to an unduly small quantity while the regeneration control is executed in response to the regeneration execution command.

The present invention has been made in view of the above described problem and has as an object to provide a technology that enables, in an exhaust gas purification apparatus regeneration system of an internal combustion engine, to prevent the remaining fuel quantity from decreasing to an unduly small quantity during execution of the regeneration control for regenerating the exhaust gas purification ability of the exhaust gas purification apparatus by supplying fuel to the exhaust gas purification apparatus.

According to the present invention, in executing regeneration control for regenerating the exhaust gas purification ability of an exhaust gas purification apparatus by supplying fuel to the exhaust gas purification apparatus, the time to give notification for prompting a driver to execute the regeneration control is controlled in such a way that the remaining fuel is prevented from becoming equal to or smaller than a specified remaining quantity during execution of the regeneration control.

More specifically, an exhaust gas purification apparatus regeneration system of an internal combustion engine according to the present invention comprises:

regeneration control execution device for executing regeneration control of regenerating the exhaust gas purification ability of an exhaust gas purification apparatus provided in an exhaust passage of the internal combustion engine to purify the exhaust gas, by supplying fuel to the exhaust gas purification apparatus;

command device capable of being operated by a driver, for sending a regeneration execution command to said regeneration control execution device to cause it to execute the regeneration control; and notification device for notifying the driver to prompt the driver to send the regeneration execution command to said regeneration control execution device through said command device, wherein time of notification by said notification device is controlled so that it is prevented that the regeneration execution command is sent to said regeneration control execution device by said command device while notification is given to the driver by said notification device and the quantity of remaining fuel becomes equal to or lower than a specified remaining quantity during execution of the regeneration control executed in response to the regeneration execution command.

According to the present invention, the command device for sending the regeneration execution command to the regeneration control execution device can be operated by the driver. In addition, the notification device gives notification to the effect that the regeneration execution command should be sent to the regeneration control execution device through the command device, whereby the driver can be prompted to activate the regenerate control. The regeneration control is executed when the driver operates the command device so as to send the regeneration execution command to the regeneration control execution device while the notification is being performed by the notification device.

From the above follows that according to the present invention, execution of the regeneration control is started while the notification by the notification device is being performed. Therefore, the time of execution of the regeneration control can be controlled by controlling the time of the notification by the notification device.

In view of the above, according to the present invention, the time of the notification by the notification device is controlled so that the remaining fuel quantity does not become equal to or smaller than a specified remaining quantity during execution of the regeneration control. In other words, the time of the notification by the notification device is controlled so that the remaining fuel quantity does not become equal to or smaller than a specified remaining quantity even when fuel is used for the regeneration control by execution of the regeneration control.

Here, the specified remaining quantity is a quantity that is larger than a threshold quantity at which it can be determined that the remaining fuel quantity is unduly small. The specified remaining quantity is a value determined in advance.

By controlling the time of the notification by the notification device as described above, the remaining fuel quantity can be prevented from becoming unduly small during execution of the regeneration control for regenerating the exhaust gas purification ability of the exhaust gas purification apparatus by supplying fuel to the exhaust gas purification apparatus.

The system according to the present invention may further comprise regeneration fuel quantity estimation device for estimating a regeneration fuel quantity defined as the quantity of fuel needed to regenerate the exhaust gas purification ability of the exhaust gas purification apparatus to a regeneration termination level by executing the regeneration control by the regeneration control execution device. In this case, when the remaining fuel quantity is smaller than the sum of the regeneration fuel quantity and the specified remaining quantity, the notification by said notification device may be disabled.

Here, the regeneration termination level is the level at which execution of the regeneration control is to be terminated. The regeneration termination level may be a value determined in advance. The regeneration fuel quantity estimation device may presume the operation state of the internal combustion engine during execution of the regeneration control and may estimate the regeneration fuel quantity based on the operation state. In the case where the regeneration control executed in response to the regeneration execution command sent from the command device to the regeneration execution control device is to be executed only when the operation state of the internal combustion engine is a specified operation state, the regeneration fuel quantity estimation device may estimate the regeneration fuel quantity based on that specified operation state.

If execution of the regeneration control is started when the remaining fuel quantity is smaller than the sum of the regeneration fuel quantity and the specified remaining quantity, there is a possibility that the remaining fuel quantity becomes smaller than the specified remaining quantity by the time the exhaust gas purification ability of the exhaust gas purification apparatus reaches the regeneration termination level.

In view of this, when the remaining fuel quantity is smaller than the sum of the regeneration fuel quantity and the specified remaining quantity, the notification by the notification device is disabled, as described above. Thus, it can be prevented that the regeneration execution command is sent from the command device to the regeneration control execution device when the remaining fuel quantity is smaller than the sum of the regeneration fuel quantity and the specified remaining quantity and the regeneration control is executed in response to the regeneration execution command. Therefore, the remaining fuel quantity can be prevented from becoming unduly small during execution of the regeneration control.

The regeneration fuel quantity becomes the maximum when the regeneration control is executed while the operation state of the internal combustion engine 1 is in an idling state. In view of this, in the above described case, the regeneration fuel quantity may be estimated under the assumption that the operation state of the internal combustion engine during execution of the regeneration control is in an idling state. Thus, the notification by the notification device is disabled in the state in which the remaining fuel quantity is larger. Accordingly, the remaining fuel quantity can be prevented more reliably from becoming unduly small during execution of the regeneration control.

According to the present invention, if the remaining fuel quantity is larger than the sum of the regeneration fuel quantity estimated by the regeneration fuel quantity estimation device and the specified remaining quantity when the exhaust gas purification ability of the exhaust gas purification apparatus decreases to or below a notification start level, the notification by said notification device may be started.

Here, the notification start level is a level higher than the lower limit level of the permissible range of the exhaust gas purification ability of the exhaust gas purification apparatus. The notification start level is a level determined in advance.

When execution of the regeneration control is started when the remaining fuel quantity is equal to or larger than the regeneration fuel quantity and the specified remaining quantity, it can be considered that the possibility that a quantity of fuel equal to or larger than specified remaining quantity will remain after completion of execution of the filter regeneration control is high.

According to the above described feature, the driver can be prompted to start execution of the regeneration control when the remaining fuel quantity is equal to or larger than the sum of the regeneration fuel quantity and the specified remaining quantity.

The system according to the present invention may further be provided with automatic start device for starting execution of the regeneration control by said regeneration control execution device even in the absence of the regeneration execution command from said command device if the operation state of said internal combustion engine is an automatic regeneration practicable operation state when the exhaust gas purification ability of said exhaust gas purification apparatus decreases to an automatic regeneration start level.

Here, the automatic regeneration start level is a level higher than the notification start level. The automatic regeneration start level is a level determined in advance. The automatic regeneration practicable operation state is an operation state in which the regeneration control can be started by the automatic start device. The automatic regeneration practicable operation state is a state determined in advance.

In the case where the automatic start device is provided, if the operation state of the internal combustion engine is the automatic regeneration practicable operation state, the regeneration control is started automatically at the time when the exhaust gas purification ability of the exhaust gas purification apparatus reaches the automatic regeneration start level, before the exhaust gas purification ability of the exhaust gas purification apparatus decreases to the notification start level. However, if the operation state of the internal combustion engine at the time when the exhaust gas purification ability of the exhaust gas purification apparatus reaches the automatic regeneration start level is not the automatic regeneration practicable operation state, the regeneration control is not started by the automatic start device, and the exhaust gas purification ability of the exhaust gas purification apparatus will decrease further.

In view of this, according to the present invention, the notification by the notification device may be also started when the remaining fuel quantity becomes equal to a quantity obtained by adding a predetermined quantity further to the sum of the regeneration fuel quantity estimated by the regeneration fuel estimation device and the specified remaining quantity while the exhaust gas purification ability of the exhaust gas purification apparatus is higher than the notification start level and lower than the automatic regeneration start level.

When the remaining fuel quantity has become small to some extent, the remaining fuel quantity may become equal to the sum of the regeneration fuel quantity and the specified remaining quantity by the time the exhaust gas purification ability of the exhaust gas purification apparatus becomes equal to the notification start level after it has become lower than the automatic regeneration start level, in some cases. However, as described above, if execution of the regeneration control is started after the time at which the remaining fuel quantity becomes equal to the sum of the regeneration fuel quantity and the specified remaining quantity, namely after the remaining fuel quantity has become smaller than the sum of the regeneration fuel quantity and the specified remaining quantity, there is a possibility that the remaining fuel quantity becomes equal to or smaller than the specified remaining quantity by the time execution of the manual regeneration control ends.

In view of this, as described above, the notification by the notification device is started when the remaining fuel quantity becomes equal to the quantity obtained by adding a predetermined quantity further to the sum of the regeneration fuel quantity and the specified remaining quantity while the exhaust gas purification ability of the exhaust gas purification apparatus is lower than the automatic regeneration start level even if the exhaust gas purification ability of the exhaust gas purification apparatus has not decreased to the notification start level.

Here, the predetermined quantity is a quantity that is determined in advance. This predetermined quantity may be a quantity that is considered to be sufficiently large as the value of the sum of the quantity of fuel consumed in driving the internal combustion engine from the time the notification by the notification device is started to the time execution of the regeneration control is started by supply of the regeneration execution command to the regeneration control execution device and the quantity of fuel needed to recover the decrease in the exhaust gas purification ability of the exhaust gas purification apparatus during that time period by the regeneration control. With the above described feature, the driver can be prompted to activate execution of the regeneration control when the remaining fuel quantity is equal to or larger than the sum of the regeneration fuel quantity and the specified remaining quantity.

According to the present invention, the regeneration termination level may be set to a regeneration completion level serving as a threshold value at which it can be determined that regeneration of the exhaust gas purification ability of the exhaust gas purification apparatus has been substantially completed.

Here, the regeneration completion level may be a value determined in advance. The regeneration completion level may be set as a level at which it can be determined that the exhaust gas purification ability of the exhaust gas purification apparatus will not be regenerated further even if the regeneration control is continued.

According to the present invention, in the case where there is further provided remaining quantity level decrease estimation device for estimating a remaining quantity level decrease defined as a decrease in the level of the exhaust gas purification ability of the exhaust gas purification apparatus caused by driving said internal combustion engine with a quantity of fuel equal to the sum of the specified remaining quantity and the predetermined quantity, the regeneration termination level may be set to a level higher than said automatic regeneration start level by the remaining quantity level decrease.

Even in cases where the notification by the notification device is started when the remaining fuel quantity becomes equal to the quantity obtained by adding the predetermined quantity further to the sum of the regeneration fuel quantity and the specified remaining quantity and the regeneration control is executed thereafter, driving of the internal combustion engine may be continued with the remaining fuel after termination of execution of the regeneration control, in some cases. In such cases, the exhaust gas purification ability of the exhaust gas purification apparatus will decrease again while driving of the internal combustion engine goes on.

In cases where execution of the regeneration control is started at the time when the notification by the notification device is started at the above described timing, the remaining fuel quantity at the time when execution of the regeneration control is terminated will be equal to the sum of the specified remaining quantity and the predetermined quantity. In other words, the fuel quantity equal to the sum of the specified remaining quantity and the predetermined quantity is the maximum quantity of the remaining fuel quantity at the time of termination of execution of the regeneration control. In connection with this, the remaining quantity level decrease is the decrease in the level of the exhaust gas purification ability of the exhaust gas purification apparatus that is caused by driving the internal combustion engine with a quantity of fuel equal to the sum of the specified remaining quantity and the predetermined quantity.

As per the above, in the case where the regeneration termination level is set to a level higher than the automatic regeneration start level by the remaining quantity level decrease, if driving of the internal combustion engine is continued after termination of execution of the regeneration control, the remaining fuel quantity will become zero before the exhaust gas purification ability of the exhaust gas purification apparatus decreases to the automatic regeneration start level again. Accordingly, in the case where the regeneration termination level is set to the level higher than the automatic regeneration start level by the remaining quantity level decrease, it is highly possible that after termination of execution of the regeneration control, refueling is done before the exhaust gas purification ability of the exhaust gas purification apparatus decreases to the automatic regeneration start level.

The exhaust gas purification ability of the exhaust gas purification apparatus further decreases as the internal combustion engine is operated after refueling, wherein the exhaust gas purification ability of the exhaust gas purification apparatus reaches the automatic regeneration start level before it decreases to the notification start level. If the operation state of the internal combustion engine is the automatic regeneration practicable operation state at the time when the exhaust gas purification ability of the exhaust gas purification apparatus reaches the automatic regeneration start level, the regeneration control is automatically executed by the automatic start device.

Thus, with the above described feature, the notification by the notification device is prevented from being started again in a short time after execution of the regeneration control performed in association with the notification by the notification device.

According to the present invention, in the case where estimation device for estimating frequency of the notification performed by the notification device while the internal combustion engine is running is provided, when the frequency of the notification by the notification device estimated by the estimation device is equal to or higher than a specified frequency, the regeneration termination level may be set to the regeneration completion level, and when the frequency of the notification by the notification device estimated by the estimation device is lower than the specified frequency, the regeneration termination level may be set to a level higher than the automatic regeneration start level by the remaining quantity level decrease.

Here, the specified frequency is a frequency that is determined in advance. The specified frequency may be set to a threshold frequency at which it can be determined that the frequency of the notification by the notification device is unduly high.

If the exhaust gas purification ability of the exhaust gas purification apparatus decreases again after termination of execution of the regeneration control, the exhaust gas purification ability of the exhaust gas purification apparatus reaches the automatic regeneration start level before it decreases to the notification start level, irrespective of whether the regeneration termination level is set to the regeneration completion level or the level higher than the automatic regeneration start level by the remaining quantity level decrease.

However, if the operation state of the internal combustion engine is not the automatic regeneration practicable operation state at the time when the exhaust gas purification ability of the exhaust gas purification apparatus reaches the automatic regeneration start level, execution of the regeneration control is not started at that time. Accordingly, the exhaust gas purification ability of the exhaust gas purification apparatus will decrease further.

Here, the exhaust gas purification ability of the exhaust gas purification apparatus at the time of termination of execution of the regeneration control will be lower in the case where the regeneration termination level is set to the level higher than the automatic regeneration start level by the remaining quantity level decrease than in the case where the regeneration termination level is set to the regeneration completion level. Therefore, in the above described situation, in the case where the regeneration termination level is set to the level higher than the automatic regeneration start level by the remaining quantity level decrease, the exhaust gas purification ability of the exhaust gas purification apparatus will decrease to the notification start level at an earlier time as compared to the case where the regeneration termination level is set to the regeneration completion level. Consequently, there is a possibility that the frequency of the notification by the notification device becomes higher.

In view of this, when the frequency of the notification by the notification device estimated by the estimation device is equal to or higher than the specified frequency, the regeneration termination level is set to the regeneration completion level, as described above. With this feature, the frequency of the notification by the notification device can be made low.

On the other hand, in the case where the regeneration termination level is set to the level higher than the automatic regeneration start level by the remaining quantity level decrease, the regeneration control will end earlier as compared to the case where the regeneration termination level is set to the regeneration completion level. Accordingly, the time taken in one regeneration control can be made shorter.

As described before, whether or not the regeneration control is started by the automatic regeneration start device when the exhaust gas purification ability of the exhaust gas purification apparatus reaches the automatic regeneration start level is determined depending on the operation state of the internal combustion engine at that time. Accordingly, the frequency of the decrease in the exhaust gas purification ability of the exhaust gas purification apparatus down to the notification start level or the frequency of the notification by the notification device varies depending on the operation state of the internal combustion engine. Therefore, the frequency of the notification by the notification device can be estimated by estimating the operation state of the internal combustion engine based on the history of the operation of the internal combustion engine and so on.

According to the present invention, the exhaust gas purification apparatus may have a filter for trapping PM contained in the exhaust gas. In this case, the level of the exhaust gas purification ability of the exhaust gas purification apparatus decreases with an increase in the amount of PM deposited in the filter. Accordingly, the regeneration control executed by the regeneration control execution device may be filter regeneration control for oxidizing and removing PM deposited in the filter. In this case, when the amount of PM deposited in the filter decreases to a regeneration termination deposition amount, it may be determined that the exhaust gas purification ability of the exhaust gas purification apparatus has been regenerated to reach the regeneration termination level. In addition, the regeneration fuel quantity estimated by the regeneration fuel quantity estimation device may be a quantity of fuel that is needed to reduce the amount of PM deposited in said particulate filter to the regeneration termination deposition amount.

In the above described case, when the amount of PM deposited in the filter increases to or larger than a notification start deposition amount, it may be determined that the exhaust gas purification ability of the exhaust gas purification apparatus has decreased to or below the notification start level. In addition, when the amount of PM deposited in the filter increases to or larger than an automatic regeneration start deposition amount, it may be determined that the exhaust gas purification ability of the exhaust gas purification apparatus has decreased to or below the automatic regeneration start level.

According to the present invention, the exhaust gas purification apparatus may have an NOx catalyst. In this case, the level of the exhaust gas purification ability of the exhaust gas purification apparatus decreases with an increase in SOx stored in the NOx catalyst. Accordingly, the regeneration control executed by the regeneration control execution device may be SOx-poisoning regeneration control for reducing SOx stored in the NOx catalyst. In this case, when the amount of SOx stored in the NOx catalyst decreases to a regeneration termination storage amount, it may be determined that the exhaust gas purification ability of the exhaust gas purification apparatus has been regenerated to reach the regeneration termination level. In addition, the regeneration fuel quantity estimated by the regeneration fuel quantity estimation device may be a quantity of fuel needed to reduce the amount of SOx stored in the NOx catalyst to the regeneration termination storage amount.

In the above described case, when the amount of SOx stored in the NOx catalyst increases to or larger than a notification start storage amount, it may be determined that the exhaust gas purification ability of the exhaust gas purification apparatus has decreased to or below the notification start level. In addition, when the amount of SOx stored in the NOx catalyst increases to an automatic regeneration start storage amount, it may be determined that the exhaust gas purification ability of the exhaust gas purification apparatus has decreased to the automatic regeneration start level.

According to the present invention, the command device may be a regeneration execution switch provided in a vehicle on which the internal combustion engine is mounted. In this case, the regeneration execution command is sent to the regeneration control execution device upon turning on of the regeneration execution switch.

BEST MODE FOR CARRYING OUT THE INVENTION

In the following, specific embodiments of the exhaust gas purification apparatus regeneration system of an internal combustion engine according to the present invention will be described with reference to the drawings.

Embodiment 1

<General Structure of Air-Intake and Exhaust Systems and Fuel System of Internal Combustion Engine>

Figure 1:
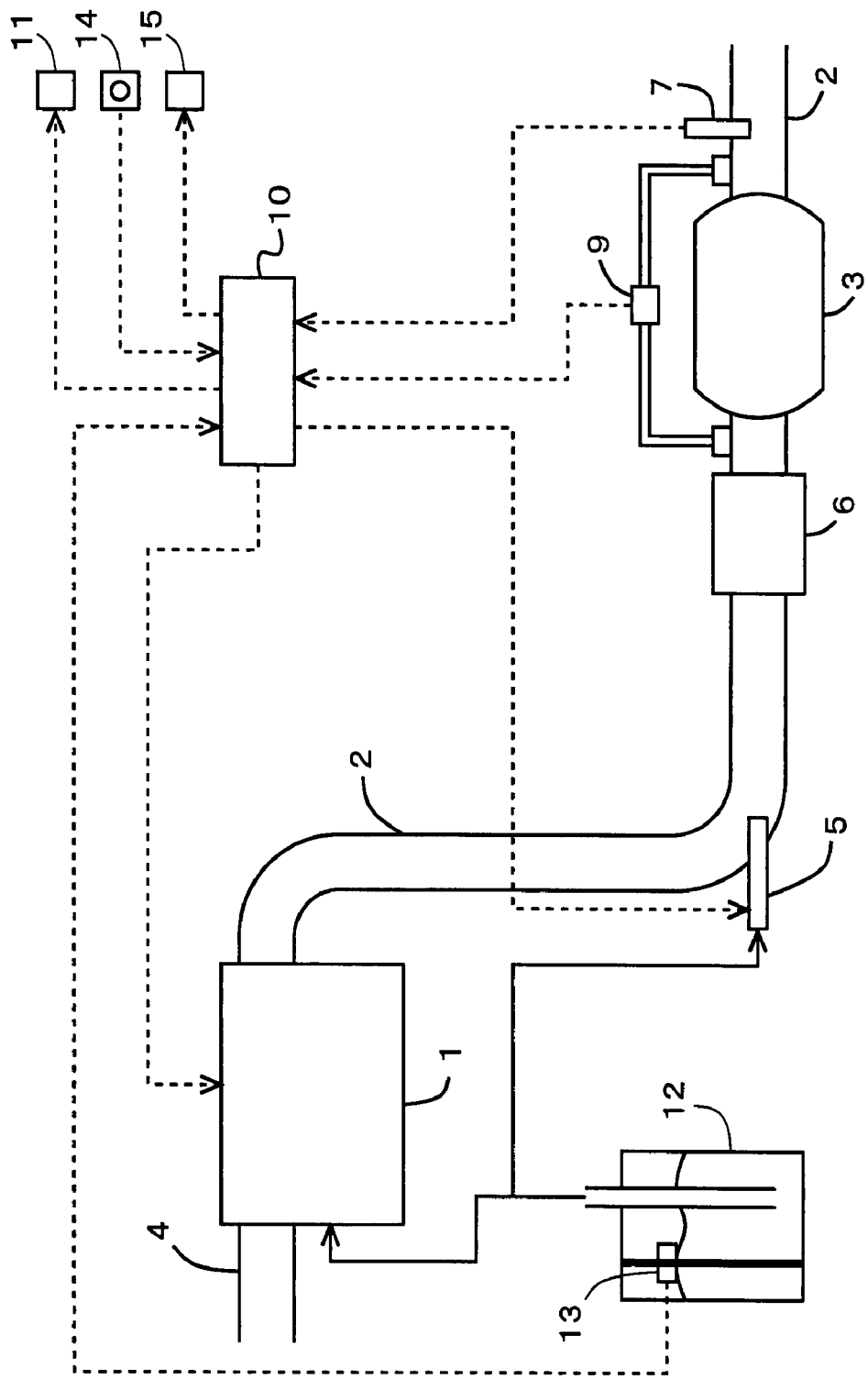
FIG. 1 illustrates the general structure of air-intake and exhaust systems and a fuel system of an internal combustion engine according to an embodiment of the present invention.

Here, the present invention will be described taking as an example a case in which the present invention is applied to a diesel engine for driving a vehicle. FIG. 1 illustrates the general structure of air-intake and exhaust systems and a fuel system of an internal combustion engine according to the embodiment.

The internal combustion engine 1 is a diesel engine for driving a vehicle. To the internal combustion engine 1 are connected an intake passage 4 and an exhaust passage 2. An oxidation catalyst 6 is provided in the exhaust passage 2. A filter 3 for trapping PM contained in the exhaust gas is provided in the exhaust passage 2 in the downstream of the oxidation catalyst 6. The filter 3 supports an NOx catalyst on it. In this embodiment, the oxidation catalyst 6 and the filter 3 constitute the exhaust gas purification apparatus according to the present invention.

A fuel addition valve 5 for adding fuel into the exhaust gas is provided in the exhaust passage 2 in the upstream of the oxidation catalyst 6. In the exhaust passage 2, there is also provided a pressure difference sensor 9 that outputs an electric signal indicative of the difference between the pressure in the exhaust passage 2 downstream of the oxidation catalyst 6 and upstream of the filter 3 and the pressure in the exhaust passage 2 downstream of the filter 3. Furthermore, an exhaust gas temperature sensor 7 that outputs an electric signal indicative of the temperature of the exhaust gas flowing in the exhaust passage 2 is provided in the exhaust passage 2 in the downstream of the filter 3.

In a fuel tank 12 that stores fuel to be supplied to the fuel injection valve of the internal combustion engine 1 and the fuel addition valve 5, there is provided a float sensor 13 that outputs an electric signal indicative of the fuel level.

To the internal combustion engine 1 having the above-described structure is annexed an electronic control unit (ECU) 10 that controls the internal combustion engine 1. The ECU 10 is a unit for controlling the operation state of the internal combustion engine 1 according to operation conditions of the internal combustion engine 1 and driver's demands. The ECU 10 is electrically connected with various sensors such as the pressure difference sensor 9, the exhaust gas temperature sensor 7 and the float sensor 13. The output signals from these sensors are input to the ECU 10. The ECU 10 estimates the amount of PM deposited in the filter 3 based on the value of the output from the pressure difference sensor 9. The ECU 10 also estimates the temperature of the filter 3 based on the value of the output from the exhaust gas temperature sensor 7. The ECU 10 also estimates the remaining fuel quantity based on the value of the output from the float sensor 13. Furthermore, the ECU 10 is electrically connected with the fuel addition valve 5 and the fuel injection valve of the internal combustion engine 1, which are controlled by the ECU 10. In the driver's cabin of the vehicle on which the internal combustion engine 1 according to this embodiment is mounted, there is provided a fuel warning lamp 11, a regeneration switch 14 and a regeneration notification lamp 15, which are electrically connected with the ECU 10.

The fuel warning lamp 11 is lit by a signal from the ECU 10 when the remaining fuel quantity in the fuel tank 12 is equal to or smaller than a specified remaining quantity. Here, the specified remaining quantity is a threshold quantity at which it can be determined that the remaining fuel quantity is unduly small. The specified remaining quantity is a predetermined value.

The regeneration switch 14 can be operated at least by the driver, and when it is turned on, a regeneration execution command for executing filter regeneration control that will be described later is sent to the ECU 10. The regeneration notification lamp 15 is lit to give notification to the driver as a prompt to turn on the regeneration switch 14. The regeneration notification switch 15 is lit by a signal from the ECU 10. In this embodiment, the regeneration switch 14 constitutes the command device according to the present invention, and the regeneration notification lamp 15 constitutes the notification device according to the present invention.

<Filter Regeneration Control>

When the amount of PM deposited in the filter 3 becomes excessively large, the PM trapping ability of the filter 3 is deteriorated. This leads to deterioration of the exhaust gas purification ability of the filter 3. Furthermore, when the amount of PM deposited in the filter 3 increases excessively, there is a risk that an increase in the pressure in the exhaust passage 2 upstream of the filter 3 may excessively affect the operation state of the internal combustion engine 1. In view of this, according to this embodiment, a filter regeneration control is performed so as to oxidize and remove the PM deposited in the filter 3.

The filter regeneration control according to this embodiment is performed by adding fuel into the exhaust gas through the fuel addition valve 5 to supply the fuel to the oxidation catalyst 6 and the filter 3. The fuel supplied to them is oxidized by the oxidation catalyst 6 or the NOx catalyst supported on the filter 3. Oxidation heat generated thereby raises the temperature of the filter 3 to a target temperature, whereby the deposited PM is oxidized and removed. Here, the target temperature is a temperature at which the PM deposited in the filter 3 can be removed by oxidation while excessive temperature rise of the filter 3 can be prevented.

Execution of the filter regeneration control according to this embodiment is terminated when the amount of PM deposited in the filter 3 is decreased, by execution of the filter regeneration control, to a regeneration termination deposition amount.

In the filter regeneration control, fuel may be supplied to the oxidation catalyst 6 and the filter 3 by performing sub fuel injection in the internal combustion engine 1 instead of adding fuel through the fuel addition valve 5. The regeneration termination deposition amount in this embodiment may be a predetermined amount at which it can be considered that removal of PM from the filter is substantially completed.

<Automatic Regeneration Control and Manual Regeneration Control>

In this embodiment, when the operation state of the internal combustion engine 1 is an automatic regeneration practicable operation state at the time when the amount of PM deposited in filter 3 increases to an automatic regeneration start deposition amount, execution of the filter regeneration control is automatically started by the ECU 10. Hereinafter, the filter regeneration control that is automatically started in this way will be referred to as the automatic regeneration control.

Here, the automatic regeneration start deposition amount is an amount that is determined in advance, and it is smaller than the upper limit value of the permissible range of the amount of PM deposited in the filter 3. The automatic regeneration practicable operation state refers to a predetermined operation state in which the automatic regeneration control can be started by the ECU 10.

Nevertheless, even when the amount of PM deposited in the filter 3 reaches the automatic regeneration start deposition amount, the automatic regeneration control is not executed in cases where the operation state of the internal combustion engine 1 is not the automatic regeneration practicable operation state. In such cases, the amount of PM deposited in the filter 3 will further increase.

In view of this, in this embodiment, the filter regeneration control can be activated also when the driver turn on the regeneration switch 14. When the regeneration switch 14 is turned on, a regeneration execution command is sent to the ECU 10. In response to the regeneration execution command, the ECU 10 starts execution of the filter regeneration control. Hereinafter, the filter regeneration control that is started by turning on the regeneration switch 14 will be referred to as the manual regeneration control.

As per the above, according to this embodiment, even when the amount of PM deposited in the filter 3 becomes larger than the automatic regeneration start deposition amount, PM deposited in the filter 3 can be oxidized and removed by executing the manual regeneration control.

In this embodiment, the manual regeneration control is to be executed when the operation state of the internal combustion engine 1 is in an idling state. In other words, when executing the manual regeneration control, the driver should first cause the operation state of the internal combustion engine 1 to idle, and thereafter turn on the regeneration switch 14.

The amount of PM deposited in the filter 3 at the time when execution of the filter regeneration control is started differs between the case of the automatic regeneration control and the case of the manual regeneration control. Accordingly, it is preferred that different target temperatures be set. In the case of the manual regeneration control, since the amount of PM deposited in the filter 3 at the time when execution is started varies depending on the time of starting execution thereof, the target temperature may be varied according to the amount of deposited PM at the time of starting the execution.

<Regeneration Notification Lamp Lighting Control>

In this embodiment, the regeneration notification lamp 15 is lit to prompt the driver to activate the manual regeneration control. Specifically, when the amount of PM deposited in the filter 3 is larger than the automatic regeneration start deposition amount, the ECU 10 lights the regeneration notification lamp 15 to thereby prompt the driver to activate the manual regeneration control by turning on the regeneration switch 14.

However, if execution of the manual regeneration control is started when the remaining fuel quantity is insufficient, there is a risk that the remaining fuel quantity may decrease to a quantity equal to or smaller than the specified remaining quantity during execution of the manual regeneration control and the fuel warning lamp 11 may be lit.

In view of this, in this embodiment, a regeneration notification lamp lighting control for controlling the lighting time of the regeneration notification lamp 15 so that the remaining fuel quantity does not become equal to or smaller than the specified remaining quantity during execution of the manual regeneration control.

In this embodiment, the manual regeneration control is executed after lighting of the regeneration notification lamp 15 has been started. Therefore, by controlling the lighting time of the regeneration notification lamp 15, the execution time of the manual regeneration control can be controlled to be a time that does not invite a decrease in the remaining fuel quantity down to a quantity equal to or smaller than the specified remaining quantity during execution of the manual regeneration control.

Figure 2:
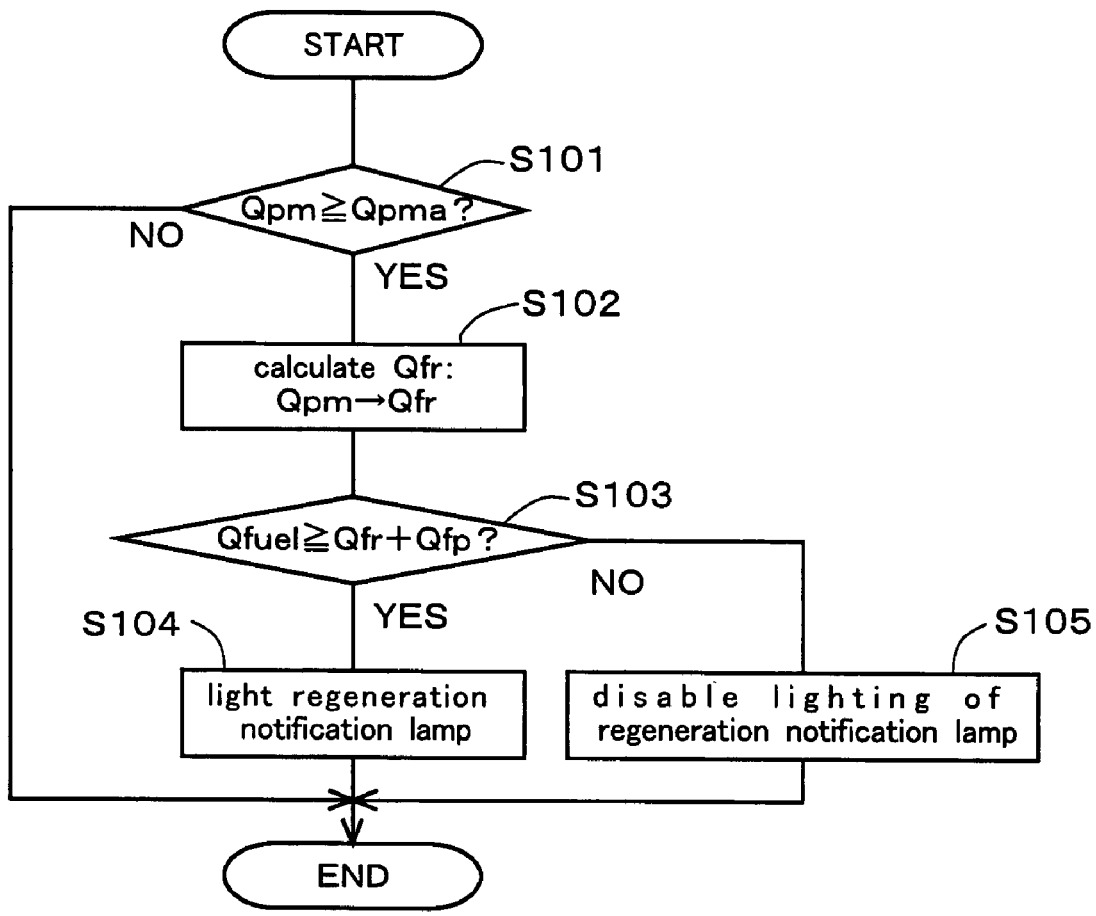
FIG. 2 is a flow chart of a control routine of a regeneration notification lamp lighting control according to embodiment 1 of the present invention.

In the following, a control routine of the regeneration notification lamp lighting control according to this embodiment will be described with reference to the flow chart in FIG. 2. This routine is stored in the ECU 10 in advance and executed at specified time intervals while the internal combustion engine is running.

In this routine, first in step S101, the ECU 10 makes a determination as to whether or not the amount of PM deposited in the filter 3 is equal to or larger than the notification start deposition amount $Q_{pma}$. Here, the notification start deposition amount $Q_{pma}$ is a quantity larger than the automatic regeneration start deposition amount $Q_{pmb}$ and smaller than the upper limit of the permissible range of the amount of PM deposited in the filter 3. The notification start deposition amount $Q_{pma}$ is also a predetermined amount as with the automatic regeneration start deposition amount $Q_{pmb}$. If the determination in step S101 is affirmative, the process of the ECU 10 proceeds to step S102, and if the determination is negative, the ECU 10 once terminates execution of this routine.

In step S102, the ECU 10 calculates a regeneration fuel quantity $Q_{fr}$ based on the current deposited PM amount $Q_{pm}$. The regeneration fuel quantity $Q_{fr}$ is the quantity of fuel that is needed to decrease the deposited PM amount $Q_{pm}$ to the regeneration termination deposition amount $Q_{pme}$ when the manual regeneration control is executed, that is, the fuel quantity needed in the manual regeneration control. In this embodiment, the operation state of the internal combustion engine 1 during execution of the manual regeneration control is in an idling state, as described above. Accordingly, the regeneration fuel quantity $Q_{fr}$ is calculated as the quantity of fuel needed to decrease the deposited PM amount $Q_{pm}$ to the regeneration termination deposition amount $Q_{pme}$ when the filter regeneration control is executed in an idling state.

Next, the process of the ECU 10 proceeds to step S103, where the ECU 10 makes a determination as to whether or not the remaining fuel quantity is equal to or larger than the sum of the regeneration fuel quantity $Q_{fr}$ and the specified remaining quantity $Q_{fp}$. If the determination in step S103 is affirmative, the process of the ECU 10 proceeds to step S104, and if the determination is negative, the process of the ECU 10 proceeds to step S105.

In step S104, the ECU 10 causes the regeneration notification lamp 15 to light up, and thereafter once terminates execution of this routine.

On the other hand, in step S105, the ECU 10 disables lighting of the regeneration notification lamp 15, and thereafter once terminates execution of this routine.

In cases where execution of the manual regeneration control is started when the remaining fuel quantity Qfuel is smaller than the sum of the regeneration fuel quantity Qfr and the aforementioned specified remaining quantity Qfp, there is a possibility that the remaining fuel quantity Qfuel becomes smaller than the specified remaining quantity Qfp during the time till the deposited PM amount Qpm decreases to the regeneration termination deposition amount Qpme.

According to the above described control routine, when the remaining fuel quantity Qfuel is smaller than the sum of the regeneration fuel quantity Qfr and the specified remaining quantity Qfp, lighting of the regeneration notification lamp 15 is disabled. This enables to prevent the manual regeneration control from being executed when the remaining fuel quantity Qfuel is smaller than the sum of the regeneration fuel quantity Qfr and the specified remaining quantity Qfp. Thus, it can be prevented that the remaining fuel quantity Qfuel becomes smaller than the specified remaining quantity Qfp during execution of the manual regeneration control whereby the fuel warning lamp 11 is lit.

According to the above descried routine, when the amount Qpm of deposited PM in the filter 3 increases to a quantity equal to or larger than the notification start deposition amount Qpma, the regeneration notification lamp 15 is lit if the remaining fuel quantity is larger than the sum of the regeneration fuel quantity Qfr and the specified remaining quantity Qfp, in other words, if it can be determined that the possibility that a quantity of fuel equal to or larger than specified remaining quantity Qfp will remain after completion of execution of the filter regeneration control even if fuel is used in the filter regeneration control is high. This enables to prompt the driver to start execution of the manual regeneration control when the remaining fuel quantity Qfuel is larger than the sum of the regeneration fuel quantity Qfr and the specified remaining quantity Qfp.

In this embodiment, the manual regeneration control is executed when the driver turns on the regeneration switch 14. Accordingly, there are cases where running of the internal combustion engine 1 is continued without the manual regeneration control being executed even if the regeneration lamp 15 has been once lit. In such cases, according to the above described routine, lighting of the regeneration notification lamp 15 is disabled also when the remaining fuel quantity Qfuel becomes smaller than the sum of the regeneration fuel quantity Qfr and the specified remaining quantity Qfp while running of the internal combustion engine 1 goes on after lighting of the regeneration notification lamp 15 has been started. In other words, the regeneration notification lamp 15 that has been once lit is turned off.

After lighting of the regeneration notification lamp 15 has been disabled, if refueling makes the remaining fuel quantity Qfuel larger than the sum of the regeneration fuel quantity Qfr and the specified remaining quantity Qfp, the regeneration lamp 15 is lit.

In this embodiment, after lighting of the regeneration notification lamp 15 has been started, lighting of the regeneration notification lamp 15 may be stopped when the regeneration switch 14 is turned on, that is, when execution of the manual regeneration control is started.

Embodiment 2

The general structure of the air-intake and exhaust systems and the fuel system of an internal combustion engine according to this embodiment is the same as those in the above described embodiment 1, and descriptions thereof will be omitted.

In this embodiment also, the filter regeneration control is executed as the automatic regeneration control or the manual regeneration control as is the case with embodiment 1. The regeneration notification lamp lighting control same as that in embodiment 1 is also executed.

<Second Regeneration Notification Lamp Lighting Control>

In this embodiment, the regeneration notification lamp lighting control same as that in embodiment 1 will be referred to as the first regeneration notification lamp lighting control. In this embodiment, a second regeneration notification lamp lighting control is executed in addition to the first regeneration notification lamp lighting control. In the following, the second regeneration notification lamp lighting control according to this embodiment will be described.

In the second regeneration notification lamp lighting control according to this embodiment, lighting of the regeneration notification lamp 15 is started at the time when the remaining fuel quantity becomes equal to the quantity obtained by adding a predetermined quantity further to the sum of the regeneration fuel quantity and the specified remaining quantity while the amount of PM deposited in the filter 3 is smaller than the notification start deposition amount and larger than the automatic regeneration start deposition amount.

When the remaining fuel quantity has become small to some extent, the remaining quantity may become equal to the sum of the regeneration fuel quantity and the specified remaining quantity during the time till the amount of PM deposited in the filter 3 reaches the notification start deposition amount after it has become larger than the automatic regeneration start deposition amount, in some cases. However, as described above, if execution of the manual regeneration control is started after the time at which the remaining fuel quantity becomes equal to the sum of the regeneration fuel quantity and the specified remaining quantity, namely after the remaining fuel quantity has become smaller than the sum of the regeneration fuel quantity and the specified remaining quantity, there is a possibility that the remaining fuel quantity becomes equal to or smaller than the specified remaining quantity during the time till execution of the manual regeneration control ends.

In view of this, in this embodiment as described above, lighting of the regeneration notification lamp 15 is started when the remaining fuel quantity becomes equal to the quantity obtained by adding the predetermined quantity further to the sum of the regeneration fuel quantity and the specified remaining quantity while the amount of PM deposited in the filter 3 is larger than the automatic regeneration start deposition amount, even if the amount of PM deposited in the filter 3 has not reached the notification start deposition quantity.

Here, the predetermined quantity is a quantity that is determined in advance. This predetermined quantity may be a quantity that is considered to be sufficiently large as the value of the sum of the quantity of fuel consumed in driving the internal combustion engine 1 during the time period since lighting of the regeneration notification lamp 15 is started until execution of the manual regeneration control is started by turning-on of the regeneration switch 14 and the quantity of fuel needed in oxidizing and removing, by the filter regeneration control, a quantity of PM that will further deposit in the filter 3 during that period. In this case also, the predetermined amount can be determined in advance, for example, by experiments.

With the above described feature, the driver can be prompted to activate execution of manual regeneration control when the remaining fuel quantity is equal to or larger than the sum of the regeneration fuel quantity and the specified remaining quantity. If execution of the manual regeneration control is started when the remaining fuel quantity is equal to or larger than the sum of the regeneration fuel quantity and the specified remaining quantity, the remaining fuel quantity can be prevented from decreasing to or below the specified remaining quantity during execution of the manual regeneration control.

<Setting of Regeneration Termination Deposition Amount>

In this embodiment also, the filter regeneration control is terminated at the time when the amount of PM deposited in the filter 3 decreases to the regeneration termination deposition amount. In this embodiment, the regeneration termination deposition amount is set to either a regeneration completion deposition amount or a subtractive deposition amount that will be described later.

The regeneration completion deposition amount is a threshold amount of deposited PM at which it can be determined that removal of PM from the filter 3 has been substantially completed. The regeneration completion deposition amount is an amount determined in advance.

Here, the amount of PM that deposits on the filter 3 while the internal combustion engine 1 is driven by a quantity of fuel equal to the sum of the specified remaining quantity and the predetermined quantity will be referred to as the remaining quantity deposition amount. In this embodiment, the amount of deposited PM obtained by subtracting the remaining quantity deposition amount from the automatic regeneration start deposition amount will be referred to as the subtractive deposition amount.

Since the specified remaining quantity and the predetermined quantity are quantity that have been determined in advance, the remaining quantity deposition amount can be estimated. In addition, since the automatic regeneration start deposition amount is also an amount that has been determined in advance, the subtractive deposition amount can be estimated. In this embodiment, the subtractive deposition amount is larger than the regeneration termination deposition amount.

Next, a description will be made of a case where the regeneration fuel quantity is calculated with the regeneration termination deposition amount being set to the subtractive deposition amount and lighting of the regeneration notification lamp 15 is started at the time when the remaining fuel quantity becomes equal to the quantity obtained by adding the predetermined quantity further to the sum of this regeneration fuel quantity and the specified remaining quantity.

In the case where execution of the manual regeneration control is started at the time when lighting of the regeneration notification lamp 15 is started according to the above described timing, the remaining fuel quantity at the time when execution of the manual regeneration control is terminated will be equal to the sum of the specified remaining quantity and the predetermined quantity. Thus, the quantity of fuel equal to the sum of the specified remaining quantity and the predetermined quantity is the maximum value of the remaining fuel quantity at the time when execution of the manual regeneration control is terminated. As described above, the remaining quantity deposition amount is the amount of PM that deposits in the filter 3 as the internal combustion engine 1 is driven by a quantity of fuel equal to the sum of the specified remaining quantity and the predetermined quantity.

From the above follows that in the case where the regeneration termination deposition amount is set to the subtractive deposition amount defined as the deposition amount obtained by subtracting the remaining quantity deposition amount from the automatic regeneration start deposition amount, if operation of the internal combustion engine 1 is continued after termination of execution of the manual regeneration control, the remaining fuel quantity becomes zero before the amount of deposited PM increases to the automatic regeneration start deposition amount again. Accordingly, in the case where the regeneration termination deposition amount is set to the subtractive deposition amount, it is highly possible that after termination of execution of the manual regeneration control, refueling is performed before the amount of deposited PM increases to the automatic regeneration start deposition amount.

The amount of PM deposited in the filter 3 further increases with operation of the internal combustion engine 1 after refueling, where the amount of deposited PM reaches the automatic regeneration start deposition amount before it increases to the notification start deposition amount. If the operation state of the internal combustion engine 1 is the automatic regeneration practicable operation state at the time when the amount of deposited PM reaches the automatic regeneration start deposition amount, the filter regeneration control is automatically executed as the automatic regeneration control.

Thus, in the case where the regeneration termination deposition amount is set to the subtractive deposition amount, lighting of the regeneration notification lamp 15 is prevented from being started again in a short time after the manual regeneration control is executed by the driver in response to lighting of the regeneration notification lamp 15.

Here, a method of setting the regeneration termination deposition amount according to this embodiment will be described. In this embodiment, whether the regeneration termination deposition amount is set to the regeneration completion deposition amount or the subtractive deposition amount is determined according to the frequency of lighting of the regeneration notification lamp 15 during operation of the internal combustion engine 1.

Whether execution of the automatic regeneration control is to be started or not at the time when the amount of PM deposited in the filter 3 reaches the automatic regeneration start deposition amount is determined according to the operation state of the internal combustion engine 1 at that time. As described above, the amount of deposited PM increases to the notification start deposition amount on condition that the automatic regeneration control has not been executed. Accordingly, the frequency of the increase in the amount of deposited PM up to the notification start deposition amount or the frequency of lighting of the regeneration notification lamp 15 varies depending on the operation state of the internal combustion engine 1. In view of this, in this embodiment, the ECU 10 estimates the frequency of lighting of the regeneration notification lamp 15 by estimating the operation state of the internal combustion engine 1 based on the history of the operation of the internal combustion engine 1.

In this embodiment, if the frequency of lighting of the regeneration notification lamp 15 is equal to or higher than a specified frequency, the regeneration termination deposition amount is set to the regeneration completion deposition amount, while if the frequency of lighting of the regeneration notification lamp 15 is lower than the specified frequency, the regeneration termination deposition amount is set to the subtractive deposition amount.

Here, the specified frequency is a predetermined frequency that serves as a threshold value at which it can be determined that the frequency of lighting of the regeneration notification lamp 15 is excessively high.

If the amount of PM deposited in the filter 3 increases again after completion of execution of the manual regeneration control, the amount of deposited PM reaches the automatic regeneration start deposition amount before it increases to the notification start deposition amount, whether the regeneration termination deposition amount is set to the regeneration completion deposition amount or the subtractive deposition amount.

However, if the operation state of the internal combustion engine 1 is not the automatic regeneration practicable operation state at the time when the amount of deposited PM reaches the automatic regeneration start deposition amount, execution of the automatic regeneration control is not started at that time. Therefore, the amount of deposited PM will further increase.

Here, the amount of deposited PM at the time at which execution of the manual regeneration control is terminated is smaller in the case where the regeneration termination deposition amount is set to the subtractive deposition amount than in the case where the regeneration termination deposition amount is set to the regeneration completion deposition amount. Therefore, in the case where the regeneration termination deposition amount is set to the subtractive deposition amount, when the automatic regeneration control has not been executed as described above, the amount of deposited PM increases to the notification start deposition amount at an earlier time as compared to the case where the regeneration termination deposition amount is set to the regeneration completion deposition amount. Consequently, the frequency of lighting of the regeneration notification lamp 15 can be higher.

In view of this, when the frequency of lighting of the regeneration notification lamp 15 is higher than the specified frequency, the regeneration termination deposition amount is set to the regeneration completion deposition amount, as described above. This enables to make the frequency of lighting of the regeneration notification lamp 15 lower.

On the other hand, in the case where the regeneration termination deposition amount is set to the subtractive deposition amount, the manual regeneration control is terminated at an earlier time as compared to the case where the regeneration termination deposition amount is set to the regeneration completion deposition amount. This means that the time period taken in one manual regeneration control can be made shorter.

<Control Routine of Second Regeneration Notification Lamp Lighting Control>

Figure 3:
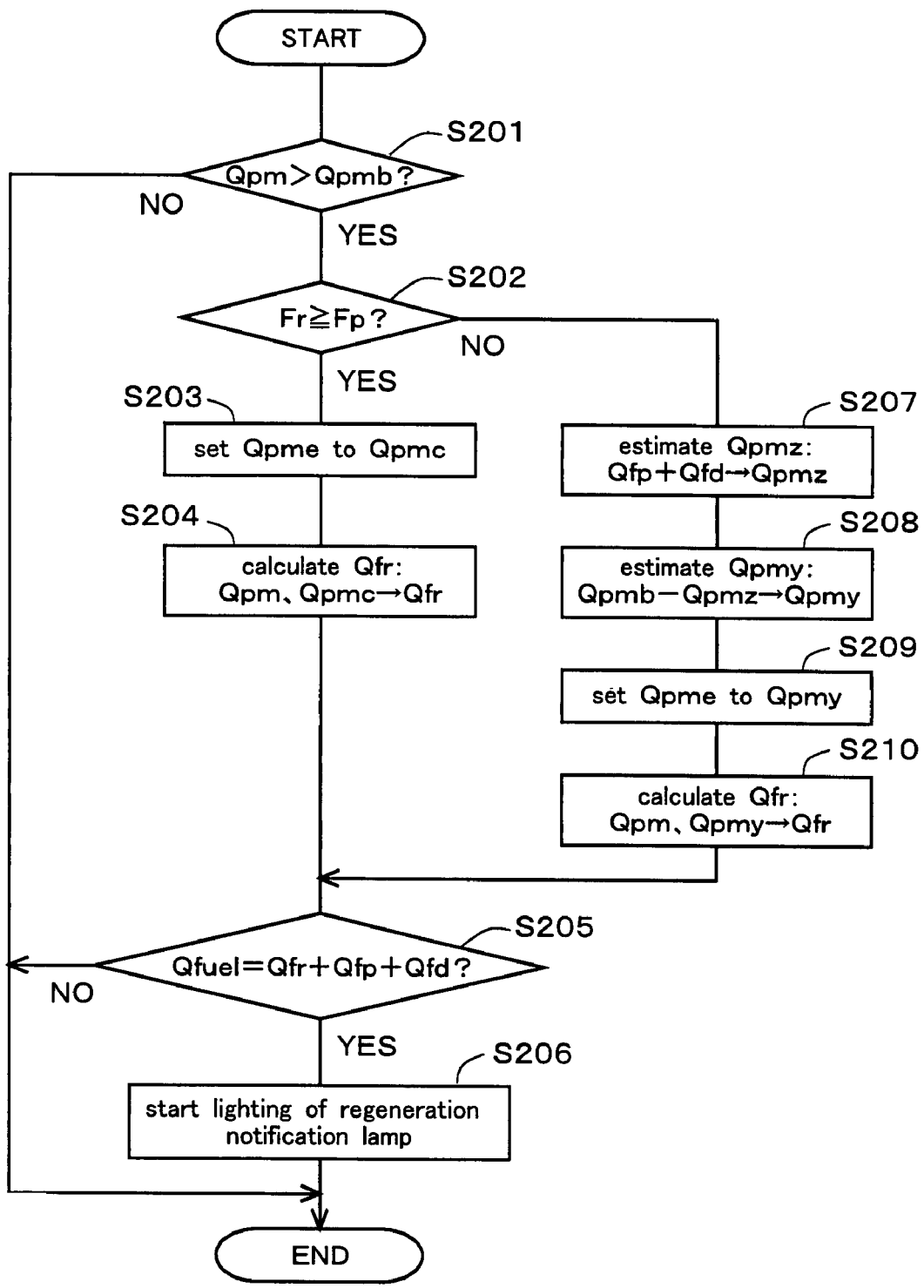
FIG. 3 is a flow chart of a control routine of a second regeneration notification lamp lighting control according to embodiment 2 of the present invention.

Next, the control routine of the second regeneration notification lamp lighting control according to this embodiment will be described with reference to the flow chart of FIG. 3. This routine is also stored in the ECU 10 in advance and executed at specified time intervals while the internal combustion engine 1 is running, as is the case with the control routine of the first regeneration notification lamp lighting control shown in FIG. 2.

In this routine, first in step S201, the ECU 10 makes a determination as to whether or not the amount of PM deposited in the filter 3 is larger than the automatic regeneration start deposition amount Qpmb. If the determination in step S201 is affirmative, the process of the ECU 10 proceeds to step S202, and if the determination is negative, the ECU 10 once terminates execution of this routine.

In step S202, the ECU 10 makes a determination as to whether or not the estimated frequency of lighting of the regeneration notification lamp 15 is equal to or larger than the specified frequency Fp. If the determination in step S202 is affirmative, the process of the ECU 10 proceeds to step S203, and if the determination is negative, the process of the ECU 10 proceeds to step S207.

In step S203, the ECU 10 sets the regeneration termination deposition amount Qpme to the regeneration completion deposition amount Qpmc.

Next, the process of the ECU 10 proceeds to step S204, where the ECU 10 calculates the regeneration fuel quantity Qfr based on the current amount of deposited PM Qpm and the regeneration completion deposition amount Qpmc. In this step, the ECU 10 calculates the regeneration fuel quantity Qfr as the quantity of fuel that is needed to reduce the amount of deposited PM Qpm to the regeneration completion deposition amount Qpmc when the operation state of the internal combustion engine 1 is in an idling state.

Next, the process of the ECU 10 proceeds to step S205, where the ECU 10 makes a determination as to whether or not the remaining fuel quantity Qfuel becomes equal to the quantity obtained by adding the predetermined quantity Qfd further to the sum of the regeneration fuel quantity Qfr and the specified remaining quantity Qfp. If the determination in step S205 is affirmative, the process of the ECU 10 proceeds to step S206, and if the determination is negative, the ECU 10 once terminates execution of this routine.

In step S206, the ECU 10 starts the lighting of the regeneration notification lamp 15, and thereafter, once terminates execution of this routine.

On the other hand, in step S207, the ECU 10 estimates the remaining quantity deposition amount Qpmz based on the sum of the specified remaining quantity Qfp and the predetermined quantity Qfd.

Thereafter, the process of the ECU 10 proceeds to step S208, where the ECU 10 calculates the subtractive deposition amount Qpmy by subtracting the remaining quantity deposition amount Qpmz from the automatic regeneration start deposition amount Qpmb.

Next, the process of the ECU 10 proceeds to step S209, where the ECU 10 sets the regeneration termination deposition amount Qpme to the subtractive deposition amount Qpmy.

Next, the process of the ECU 10 proceeds to step S210, where the ECU 10 calculates the regeneration fuel quantity Qfr based on the current amount of deposited PM Qpm and the subtractive deposition amount Qpmy. In this step, the ECU 10 calculates the regeneration fuel quantity Qfr as the quantity of fuel that is needed to reduce the amount of deposited PM Qpm to the subtractive deposition amount Qpmy when the operation state of the internal combustion engine is in an idling state, as with the above described case. After calculating the regeneration fuel quantity Qfr, the process of the ECU 10 proceeds to step S205.

According to the above described control routine, when the remaining fuel quantity Qfuel becomes equal to the amount obtained by adding the predetermined quantity Qfd further to the sum of the regeneration fuel quantity Qfr and the specified remaining quantity Qfp while the amount Qpm of PM deposited in the filter 3 is larger than the automatic regeneration start deposition amount Qpmb, lighting of the regeneration notification lamp 15 is started even if the amount Qpm of PM deposited in the filter 3 has not reached the notification start deposition amount. Therefore, the driver can be prompted to start execution of the manual regeneration control when the remaining fuel quantity Qfuel is equal to or larger than the sum of the regeneration fuel quantity Qfr and the specified remaining quantity Qfp.

In the case where the frequency Fr of lighting of the regeneration notification lamp 15 is equal to or higher than the specified frequency Fp, the regeneration termination deposition amount Qpme is set to the regeneration completion deposition amount Qpmc. This enables to reduce the frequency of lighting of the regeneration notification lamp 15. On the other hand, in the case where the frequency Fr of lighting of the regeneration notification lamp 15 is lower than the specified frequency Fp, the regeneration termination deposition amount Qpme is set to the subtractive deposition amount Qpmy. This enables to further reduce the time period taken in one manual regeneration control.

Also in the case where lighting of the regeneration notification lamp 15 is started by the second regeneration notification lamp lighting control described above, lighting of the regeneration notification lamp 15 may be stopped when the regeneration switch 14 is turned on, namely, when execution of the manual regeneration control is started.

Also in the case where the regeneration notification lamp 3 is lit when the amount of PM deposited in the filter 3 becomes equal to or larger than the notification start deposition amount according to the first regeneration notification lamp lighting control and the manual regeneration control is executed in response thereto, the regeneration termination deposition amount may be set to the regeneration completion deposition amount in cases where the frequency of lighting of the regeneration notification lamp 15 is equal to or higher than the specified frequency, while in cases where the frequency of lighting of the regeneration notification lamp 15 is lower than the specified frequency, the regeneration termination deposition amount may be set to an amount (e.g. the subtractive deposition amount) that is smaller than the automatic regeneration start deposition amount and larger than the regeneration completion deposition amount, as is the case with the second regeneration notification lamp lighting control described above.

In this case also, advantageous effects the same as those of the second regeneration notification lamp lighting control can be achieved.

Although cases in which the regeneration control according to the present invention is applied to filter regeneration control have been described as embodiments 1 and 2, similar warning lamp lighting control may be applied also to cases where the regeneration control according to the present invention is applied to SOx-poisoning regeneration control for reducing and removing SOx stored in NOx catalyst supported on the filter 3.

INDUSTRIAL APPLICABILITY

According to the exhaust gas purification system of an internal combustion engine according to the present invention, the remaining fuel quantity can be prevented from becoming unduly small during execution of regeneration control for regenerating the exhaust gas purification ability of an exhaust gas purification apparatus by supplying fuel to the exhaust gas purification apparatus.

The invention claimed is:

1. An exhaust gas purification apparatus regeneration system of an internal combustion engine comprising:

a regeneration control execution device for executing regeneration control of regenerating exhaust gas purification ability of an exhaust gas purification apparatus provided in an exhaust passage of the internal combustion engine to purify exhaust gas, by supplying fuel to the exhaust gas purification apparatus;

a command device capable of being operated by a driver, for sending a regeneration execution command to the regeneration control execution device to cause it to execute the regeneration control;

a notification device for notifying the driver to prompt the driver to send the regeneration execution command to the regeneration control execution device through the command device;

a regeneration fuel quantity estimation device for estimating a regeneration fuel quantity defined as a quantity of fuel needed to regenerate the exhaust gas purification ability of the exhaust gas purification apparatus to a regeneration termination level by executing the regeneration control by the regeneration control execution device; and an automatic start device for starting execution of the regeneration control by regeneration control execution device even in the absence of the regeneration execution command from the command device if the operation state of the internal combustion engine is an automatic regeneration practicable operation state when the exhaust gas purification ability of the exhaust gas purification apparatus decreases to an automatic regeneration start level that is higher than the notification start level, wherein time of notification by the notification device is controlled so that it is prevented that the regeneration execution command is sent to the regeneration control execution device by the command device while notification is given to the driver by the notification device and the quantity of remaining fuel becomes equal to or lower than a specified remaining quantity during execution of the regeneration control executed in response to the regeneration execution command, wherein when the remaining fuel quantity is smaller than the sum of the regeneration fuel quantity estimated by the regeneration fuel quantity estimation device and the specified quantity, the notification by the notification device is disabled, wherein if the remaining fuel quantity is larger than the sum of the regeneration fuel quantity estimated by the regeneration fuel quantity estimation device and the specified remaining quantity when the exhaust gas purification ability of the exhaust gas purification apparatus decreases to or below a notification start level, the notification by the notification device is started, and wherein the notification by the notification device is started also when the remaining fuel quantity becomes equal to a quantity obtained by adding a predetermined quantity further to the sum of the regeneration fuel quantity estimated by the regeneration fuel estimation device and the specified remaining quantity while the exhaust gas purification ability of the exhaust gas purification apparatus is higher than the notification start level and lower than the automatic regeneration start level.

2. An exhaust gas purification apparatus regeneration system of an internal combustion engine according to claim 1, wherein the regeneration termination level is set to a regeneration completion level serving as a threshold value at which it can be determined that regeneration of the exhaust gas purification ability of the exhaust gas purification apparatus has been substantially completed.

3. The exhaust gas purification apparatus regeneration system of an internal combustion engine according to claim 1, further comprising:

a remaining quantity level decrease estimation device for estimating a remaining quantity level decrease defined as a decrease in the level of the exhaust gas purification ability of the exhaust gas purification apparatus caused by driving the internal combustion engine with a quantity of fuel equal to the sum of the specified remaining quantity and the predetermined quantity, wherein the regeneration termination level is set to a level higher than the automatic regeneration start level by the remaining quantity level decrease estimated by the remaining quantity level decrease estimation device.

4. The exhaust gas purification apparatus regeneration system of an internal combustion engine according to claim 1, further comprising:

an estimation device for estimating frequency of the notification performed by the notification device while the internal combustion engine is running, wherein when the frequency of the notification by the notification device estimated by the estimation device is equal to or higher than a specified frequency, the regeneration termination level is set to a regeneration completion level serving as a threshold value at which it can be determined that regeneration of the exhaust gas purification ability of the exhaust gas purification apparatus has been substantially completed, and when the frequency of the notification by the notification device estimated by the estimation device is lower than the specified frequency, the regeneration termination level is set to a level higher than the automatic regeneration start level by the remaining quantity level decrease estimated by the remaining quantity level decrease estimation device.

5. The exhaust gas purification apparatus regeneration system of an internal combustion engine according to claim 1, wherein the exhaust gas purification apparatus has a particulate filter for trapping particulate matter in the exhaust gas, the regeneration control executed by the regeneration control execution device is filter regeneration control for oxidizing and removing particulate matter deposited in the particulate filter, and the regeneration fuel quantity estimated by the regeneration fuel quantity estimation device is a quantity of fuel that is needed to reduce the amount of particulate matter deposited in the particulate filter to a regeneration termination deposition amount.

6. The exhaust gas purification apparatus regeneration system of an internal combustion engine according to claim 1, wherein the exhaust gas purification apparatus has an NOx storage reduction catalyst, the regeneration control executed by the regeneration control execution device is SOx-poisoning regeneration control for reducing SOx stored in the NOx storage reduction catalyst, and the regeneration fuel quantity estimated by the regeneration fuel quantity estimation device is a quantity of fuel that is needed to reduce the amount of SOx stored in the NOx storage reduction catalyst to a regeneration termination storage amount.

7. The exhaust gas purification apparatus regeneration system of an internal combustion engine according to claim 1, wherein the regeneration fuel quantity estimation device estimates the regeneration fuel quantity under an assumption that the operation state of the internal combustion engine at the time when the regeneration control is executed is in an idling state.

* * * * *